Jan. 23, 1940. A. C. VAN ES Re. 21,335
PROCESS FOR EXTRACTING ORES AND THE LIKE
Original Filed Dec. 31, 1936
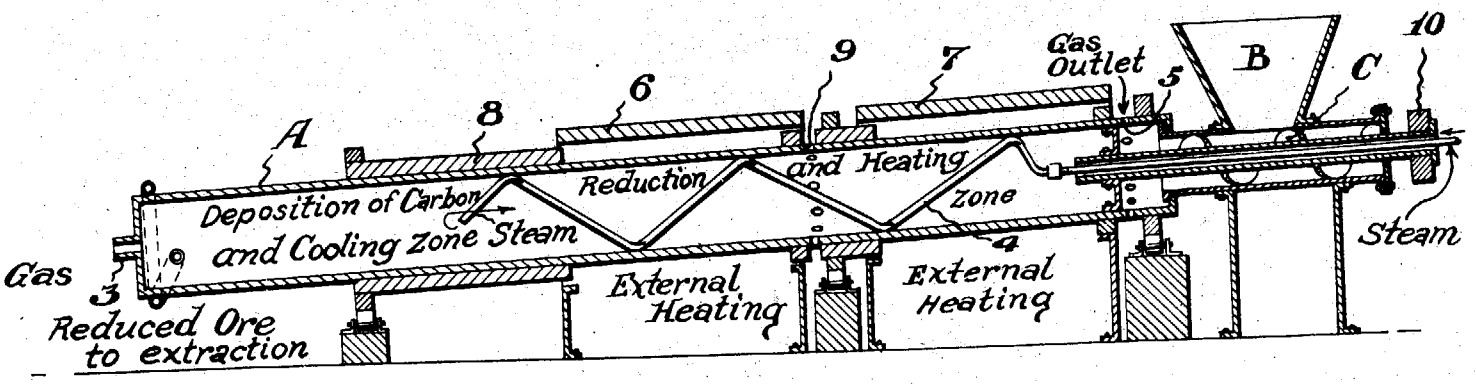
INVENTOR
A. C. Van Es
BY
Glascock Downing & Seebold
ATTORNEYS.

issued Jan. 23, 1940

Re. 21,335

UNITED STATES PATENT OFFICE 21,335

PROCESS FOR EXTRACTING ORES AND THE LIKE

Adriaan Cornelis van Es, Huizen, Netherlands, assignor of one-half to N. V. Maatschappij voor Zwavelzuurbereiding Voorheen G. T. Ketjen & Co., Amsterdam, Netherlands Original No. 2,142,926, dated January 3, 1939, Serial No. 118,685, December 31, 1936. Application for reissue August 3, 1939, Serial No. 288,247. In the Netherlands December 24, 1935

9 Claims. (Cl. 75—119)

The process relates to extracting ores and the like and more particularly to winning metals having a lower combustion heat than iron from oxide ores, including silicates and roasted sulphides.

As can be readily ascertained from any table of the heat of formation of inorganic compounds, the metals whose heat of formation of their oxides, that is their heat of combustion, is less than that of iron, are copper, nickel, cobalt, silver, mercury, tellurium, lead, palladium, platinum, iridium and ruthenium.

In order to obtain the desired metals the raw material must be made extractable. According to the present process this is effected by the application of short-circuited element-couples in the mass which has to be extracted, from which local cells are formed by subsequently adding extraction electrolytes. Care has to be taken that the metal to be obtained forms the most electronegative electrode of the couple and that a more electronegative undesired element is not present in the metallic form.

It is necessary that the local cells be accessible for the extraction electrolyte. This may be attained in an appropriate manner by bringing the ore after being made extractable into the extraction electrolyte in a more or less finely ground condition. The penetration of the electrolyte into the interior of each individual local cell may be increased by changing the pressure, the temperature and the surface tension.

In order to be able to form in the mass to be extracted the metal-couple in which the desired metal is the most electronegative one, it is necessary that a more electropositive element is present in the mass. If such element should not be present it may be fromed from constituents of the mass or it may be introduced from outside.

From the technics of the generation of current by primary cells it is known that the amount of the current delivered is considerably increased by the presence of a depolarizer in such a cell, for instance, manganese dioxide in the known Leclanché cell. In order to obtain a higher yield of metal a depolarizer may be advantageously used in the extraction operation. If for instance it is desired to extract nickel, ferric oxide may be used as such. If the raw material is an ore one of the constituents of this ore may be used as a depolarizer or converted into it. In another case it may be necessary to introduce the constituents, from which a suitable depolarizer may be formed from outside into the ore. The position of the depolarizer is in the vicinity of the most electronegative element. The depolarizer will retain a favourable action on the extraction only if the access of the electrolyte to this most electronegative element is not hindered by too large an extent of the depolarizer.

With regard to a certain electrolyte the metals are ranged in a distinct electromotive tension series. Premising that in the mass to be extracted these metals are converted into the metallic form the logical consequence will be that for one and the same electrolyte they would be obtained following that series and that also undesired metals would be obtained.

By application of another electrolyte by which another sequence in the E. M. F. series is caused, the undesired metal being the more electropositive does not dissolve.

Applicant has found that the following ways of preventing the dissolving of an undesired metal:

(*a*) From the undesired metal a compound being insoluble in the electrolyte is formed before adding the electrolyte.

(*b*) By choice of a certain electrolyte, causing the undesired metal even if it be present in the metallic state to form compounds insoluble in that electrolyte, whereas the desired metal does form soluble compounds.

The following example illustrates the process: From an ore having the following composition:

| | Per cent |
|---|---|
| Ni | 1.4 |
| $Fe_2O_3$ | 45 |
| $Al_2O_3$ | 8 |
| $SiO_2$ | 16 |
| Mg | 0.3 |
| Loss by calcination | 24 |

the nickel has to be won. Reduction of the ore by means of hydrocarbons, mixtures of hydrocarbons or other gaseous carbon compounds having reducing action at low temperature does not give any result because of the very high content of Fe of the ore. With reduction at higher temperature Ni and Fe in metallic form are formed, both coupled with carbon; the local element "iron-carbon" having an electrical tension of 1.4 volts at pH=1 and of 1.8 volts at pH=14, the local element "nickel-carbon" having an electrical tension of 1.2 volts at pH=1 and of 1.5 volts at pH=14.

Thus on extracting, all the iron would come into solution before Ni could be dissolved.

In this case the conversion of the metal Fe into an insoluble form before adding electrolyte has to be applied. Applicant has found that by mixing steam with the reduction gas, nickel can be brought into metallic form at temperatures of approximately 700° C., while in that case iron is not reduced to the metallic form but to a form which is insoluble in diluted acids. As however at such temperatures the steam oxidizes carbon, it is impossible for a local element "C-Ni" to be formed. This is produced by utilising the property of metallic nickel to react catalytically with hydrocarbons and carbon monoxide at low temperatures, e. g. 200–400° C. At such low temperatures the iron oxides formed are reduced with difficulty. According to the above considerations the manner of proceeding is as follows:

The nickel ore of the above composition is ground to a grain size of about 100 microns. This ground ore is treated with a mixture of hydrocarbons and CO, (e. g. illuminating gas, Dowson gas, generator gas, water gas) and steam in a revolving furnace at approximately 700° C. (600°–800° C.) during at most two hours. (With illuminating gas in this case the proportion gas/steam is 60:74 volume parts; for another gas and another ore this proportion is different.) Then the steam supply is cut off and the ore is cooled down to 300° C. (between 200° and 400° C.) and at this temperature the gas is passed through during at most one more hour. After a suitable cooling, thus with exclusion of oxidation, the ore treated in this manner is introduced into an extraction electrolyte, either slightly acid or ammoniacal, for instance, 0.5 per cent, sulphuric acid. Without increase of temperature 82.5 per cent of all the nickel present is extracted in two hours by this liquid with an amount of sulphuric acid equal to twice the amount theoretically necessary for this nickel. During the extraction the liquid is stirred and air is passed through.

With the same extraction electrolyte, after reducing the ore at 600°–800° C. without using steam only 8 per cent of the nickel could be dissolved in the same time.

By heating the ore reduced as described above with a neutral solution of copper sulphate it can be proved that although nearly all the nickel is dissolved only a very small percentage of the iron is present in the solution. The reduction as described may be carried out in a long revolving drum furnace. The ore is introduced at the chimney end of this furnace. At the ore discharging end gas is introduced which moves in countercurrent to the ore. At some distance from the gas inlet, thus nearer to the chimney end, steam is blown into the furnace. Still nearer to the chimney end air may be introduced into the furnace by which the combustion of the residual gas and at the same time heating of the ore to 700 C. is obtained.

In the accompanying drawing, which is to be taken by way of illustration only, and not as a limitation, A designates a rotary kiln, mounted and rotated in conventional manner. This kiln is functionally divided into reduction zones, 6 and 7, heated from without and cooling zone, 8. The upper portion of the cooling zone is lagged with non-conducting material to conserve the heat, while the lower end is free from lagging to facilitate rapid cooling.

B designates a feeding device which comprises a feeding screw C, whose axis is tubular and is rotated by pulley 10.

Within this tubular axis, a pipe for conveying steam into the kiln is located, which pipe assumes a spiral form 4 inside the kiln and ends at or near the upper end of the cooling zone.

The lower end of the kiln is closed, and the upper end is furnished with means for excluding air as shown.

Between the two heating zones, means designated by the numeral 9, for the introduction of air, are located. These means are shown simply as apertures in the wall of the kiln, but would be constructed with conventional regulating means in actual practice.

The lower end of the kiln has a discharge device which is shown as a conduit passing around a major portion of its exterior and which opens into the kiln at one end and into the atmosphere at the other end. By this device the ore always fills a portion of the conduit and excludes air from the kiln.

In operation the kiln is set in rotation, the heating zones are heated to the proper temperature, and the ore fed therein.

Steam is passed into the kiln through pipe 4, and reducing gas at its lower end, and if desired, air may be introduced between the two heating zones.

The reducing gas meets the descending ore and passes out of the kiln through apertures 5 at its upper end.

Means for controlling the amount of steam, air and reducing gas are of conventional form and are not shown.

I claim:

1. The process of extracting from their oxide and silicate ores and from their roasted sulfids, metals chosen from the group of metals having a lower heat of combustion than iron, which comprises subjecting said ores for at least twenty minutes at a temperature of at least 400° C. to the action of a reducing gas containing steam in such amount that only metals having a lower heat of combustion than iron are reduced to the metallic state, while iron and metals having a higher heat of combustion than iron are retained in an oxidized state, then cooling said reduced ores for at least fifteen minutes in the presence of a reducing gas consisting of carbon monoxide and hydrocarbons and then treating the reduced and cooled ore with an extracting electrolyte and atmospheric oxygen.

2. The process of claim 1 modified in that the reducing gas in which the cooling of reduced ores occurs is composed of hydrocarbons.

3. The process of claim 1, in which the process is carried out continuously by first passing the ore successively through a reducing zone having a temperature of at least 400° C. and a cooling zone, then passing the ore so reduced and cooled into an extraction electrolyte, the first said zone being filled with a mixture of reducing gas and steam, and the cooling zone being filled with a reducing gas mixture consisting of carbon monoxide and hydrocarbons.

4. The process of claim 1, in which the process is carried out continuously by first passing the ore successively through a reducing zone having a temperature of at least 400° C. and a cooling zone, then passing the ore so reduced and cooled into an extraction electrolyte, the first said zone being filled with a mixture of reducing gas and steam, and the cooling zone being filled with a reducing gas mixture consisting of hydrocarbons.

5. The process of extracting nickel from its ores which comprises subjecting said ores for at least twenty minutes at a temperature of at least 400° C. to the action of a reducing gas to which steam is added in such amount that only metals having a lower heat of combustion than iron are reduced to the metallic state, then cooling said reduced ores for at least fifteen minutes in the presence of a reducing gas comprising carbon monoxide and hydrocarbons and then treating the reduced and cooled ore with an extracting electrolyte and atmospheric oxygen.

6. The process of extracting nickel from its ores which comprises subjecting said ores for at least twenty minutes at a temperature of at least 400° C. to the action of a reducing gas to which steam is added in such amount that only metals having a lower heat of combustion than iron are reduced to the metallic state, then cooling said reduced ores for at least fifteen minutes in the presence of a reducing gas comprising hydrocarbons and then treating the reduced and cooled ore with an extracting electrolyte and atmospheric oxygen.

7. Process for extracting the metals having a lower combustion heat than iron from oxide ores and the like including silicates and roasted sulphides, containing these metals, iron and metals having a higher combustion heat than iron, consisting in reducing the ores at temperatures over 400° C. and during at least 20 minutes with a reducing gas to which steam is added to such an extent that only the metals having a lower heat of combustion than iron are reduced to the metallic state whilst iron and metals having a higher heat of combustion than iron are retained in the oxidized state, after which the thus reduced ores are cooled in an atmosphere of reducing gas containing carbon monoxide and/or hydrocarbons during at least 15 minutes, after which the reduced and cooled ores are brought into contact with an extracting electrolyte and atmospheric oxygen.

8. The process as claimed in claim 7 in which the process is carried out continuously in a rotary furnace wherein the ore is passed through a temperature higher than 400° C. a reducing zone where it is brought into contact with the reducing gas-steam mixture, after which it is passed through a cooling zone where it is brought into contact with a reducing gas containing carbon monoxide and/or hydrocarbons, followed by passing the thus reduced and cooled ore into an extraction electrolyte.

9. The process of extracting metals having a lower combustion heat than iron from their oxide, silicate and roasted sulphide ores, which comprises treating such ores with gaseous reducing agents and steam at such temperatures and for such time that only the metals having said lower combustion heat are reduced to the metallic state, and extracting the metals from the product with a suitable electrolyte.

ADRIAAN CORNELIS VAN ES.